United States Patent [19]

Richardson

[11] 4,317,746

[45] Mar. 2, 1982

[54] HYDROTREATING CATALYSTS

[75] Inventor: Ryden L. Richardson, Whittier, Calif.

[73] Assignee: Union Oil Company of California, Los Angeles, Calif.

[21] Appl. No.: 211,110

[22] Filed: Nov. 28, 1980

[51] Int. Cl.³ .............................................. B01J 27/18
[52] U.S. Cl. ...................................... 252/435; 252/465
[58] Field of Search ................................ 252/435, 420

[56] References Cited

U.S. PATENT DOCUMENTS

| | | | |
|---|---|---|---|
| 2,813,837 | 11/1957 | Holden | 252/465 |
| 3,223,483 | 12/1965 | Osment | 252/463 X |
| 3,645,914 | 2/1972 | Rosinski et al. | 252/463 X |
| 3,817,873 | 6/1974 | Mickelson | 252/435 |
| 3,830,752 | 8/1974 | Mickelson | 252/435 |
| 3,897,365 | 7/1975 | Feins et al. | 252/435 |
| 4,028,227 | 6/1977 | Gustafson | 208/216 PP |
| 4,035,261 | 7/1977 | Hargrove et al. | 252/465 X |
| 4,120,826 | 10/1978 | Ebel et al. | 252/465 |

FOREIGN PATENT DOCUMENTS 820536  9/1959  United Kingdom ............... 252/465

*Primary Examiner*—Delbert E. Gantz
*Assistant Examiner*—Olik Chaudhuri
*Attorney, Agent, or Firm*—Dean Sandford; Gregory F. Wirzbicki

[57] ABSTRACT

A hydrotreating catalyst comprising nickel, molybdenum, and phosphorus active components supported on gamma alumina is prepared with gamma alumina support articles partially hydrated with water vapor while the support particles are in motion relative to each other, as by passage of steam through an ebulliating bed of particulate gamma alumina.

12 Claims, No Drawings

HYDROTREATING CATALYSTS

BACKGROUND OF THE INVENTION

This invention relates to hydrocarbon conversion catalysts, and particularly to those utilized to catalyze the reaction of hydrogen with organic compounds containing nitrogen and/or sulfur so as to yield a denitrified and/or desulfurized product. More particularly, the invention is directed to catalysts, and a method for preparing catalysts, useful for the hydrodesulfurization and/or hydrodenitrogenation of hydrocarbon liquids. The invention is especially directed to catalysts of high hydrodenitrogenation activity.

In the refining of liquid hydrocarbons derived from mineral oils and other sources, it is often necessary to subject the liquid hydrocarbon or fraction thereof to hydrotreating. Hydrotreating is a process for reducing the concentration of nitrogen and sulfur components in a hydrocarbon feedstock so that, when the product hydrocarbon is eventually combusted, less $SO_2$ and NO will form, and hence present less of a pollution problem. In addition, it is often desirable to remove nitrogen from such feedstocks in order to protect hydrocracking catalysts and the like which deactivate in the presence of nitrogen.

In general, hydrotreating is accomplished by contacting the feedstock containing nitrogen and/or sulfur with a catalyst in the presence of hydrogen and under conditions, including elevated temperature and pressure, such that the sulfur components are converted to $H_2S$ and the nitrogen components to $NH_3$, both of which are separated from the desulfurized and denitrogenated liquid product.

A typical hydrotreating catalyst comprises particles containing a Group VIII active metal component and a Group VIB active metal component supported on a refractory oxide such as alumina. Oftentimes, phosphorus components are also present in the catalyst to improve its activity by increasing its acidity. One catalyst which has been successfully employed on a commercial basis consists essentially of molybdenum, nickel, and phosphorus components supported on gamma alumina. A typical preparation procedure for such a catalyst is as follows: particles of hydrated alumina are firstly formed into a desired size and shape by extruding the hydrated alumina through a die having circular or clover leaf-shaped openings therein and cutting the extruded matter into particles (or extrudates) of 1/16-½ inch lengths. After calcining at a temperature of about 1150°-1250° F., the resulting gamma alumina extrudates are in a condition to be contacted with an impregnating solution comprising dissolved salts of molybdenum and nickel in phosphoric acid. The impregnated extrudates (or composites) are then subjected to a final calcination at a temperature around 900° F. to convert the impregnated metals to their oxide forms. Subsequent conversion of the oxides to sulfides, as by contact at elevated temperatures with a hydrogen-hydrogen sulfide mixture or a hydrocarbon liquid containing organic sulfur compounds, produces a catalyst of high activity for simultaneous hydrodesulfurization and hydrodenitrogenation under conventional hydrotreating conditions. Such catalysts are especially useful where high denitrogenation activity is required.

Despite the high desulfurization and denitrogenation activity of the catalysts of the prior art, catalysts of yet higher activities are still being sought. The higher the activity of the catalyst, the more mild the conditions required to obtain a product of given sulfur and nitrogen content from a feedstock of given sulfur and nitrogen content, and the more mild the conditions, the less the amount of fuel that is consumed to achieve the desired product. Also, when more mild conditions are used, the catalyst life is extended due to lower coke formation.

In U.S. Pat. No. 2,813,837 issued to Holden, a method is taught for preparing a metals-supported catalyst, such as those comprising cobalt and molybdenum on alumina, wherein the support is calcined and then hydrated prior to impregnation with the desired active metals. The data in this patent, however, reveal that catalysts prepared by this method exhibit only marginal improvement in both desulfurization and denitrogenation activity in comparison to catalysts of similar composition but prepared without a hydrated alumina support. Accordingly, it is a major object of this invention to utilize hydrated alumina supports to prepare hydrotreating catalysts of dramatically improved denitrogenation and desulfurization activity in comparison to other catalysts of similar or identical composition. Another object is to provide a method for preparing such catalysts, and yet another object is to provide a method for using such catalysts for denitrogenating and/or desulfurizing hydrocarbon feedstocks containing detrimental nitrogen and/or sulfur compounds. A further object is to provide a hydrotreating catalyst of superior overall hydrodenitrogenation and/or hydrodesulfurization activity. These and other objects and advantages will become apparent to those skilled in the relevant art in view of the following description of the invention.

SUMMARY OF THE INVENTION

It has now been discovered that the hydrotreating activity of catalysts comprising nickel, molybdenum, and phosphorus active components on supports comprising gamma alumina is dramatically improved by preparing such catalysts with support particles partially hydrated with water vapor under conditions wherein the particles are maintained in motion, as by passing steam through an ebulliating bed of gamma alumina extrudates. When utilized in a contacting zone to hydrotreat a sulfur-containing and/or a nitrogen-containing hydrocarbon feedstock in the presence of hydrogen, nickel-molybdenum-phosphorus catalysts also containing gamma alumina particles hydrated by the foregoing method prove far more active for hydrodenitrogenation and hydrodesulfurization, and usually are at least about 25% more active for both hydrodenitrogenation and hydrodesulfurization, than present-day commercial hydrotreating catalysts of similar or identical composition.

DETAILED DESCRIPTION OF THE INVENTION

Catalysts of the present invention are prepared with porous refractory oxide particles comprising gamma alumina, preferably in a substantial proportion. Most preferably, the support consists essentially of gamma alumina and is prepared in particulate form, as by the well-known method of extruding a gel of peptized alumina through a die having openings therein of desired size and shape, after which the extruded matter is broken or is cut into extrudates of desired length. Preferred refractory oxide particles are of cylindrical shape having a cross-sectional diameter of 1/32 to ⅛ inch and a length of 1/16 to ⅜ inch. Also preferred are refractory oxide particles having lengths between 1/32 and ¾ inch and having cross-sectional shapes resembling that of a three-leaf clover, as shown, for example, in FIGS. 8 and 8A of U.S. Pat. No. 4,028,227. Preferred clover-shaped particles are such that each "leaf" of the cross-section is defined by about a 270° arc of a circle having a diameter between about 0.02 and 0.04 inches.

Particulates of an alumina gel prepared by the foregoing methods or their obvious equivalents are then calcined to convert the gel to porous particles of gamma alumina. Temperatures above about 900° F. are usually required to effect the desired conversion, with temperatures above 1100° F. being generally employed. Holding periods of one to three hours are typically utilized to produce preferred particles of gamma alumina for use herein.

In accordance with this invention, the gamma alumina-containing refractory oxide particles are hydrated by contact with water vapor so as to partially fill the available pore volume, usually with an amount of water equivalent to that which would occupy at least 2% but no more than about 40% of the total pore volume of the support particles. Preferably, the support particles are hydrated with sufficient water to fill between about 5 and about 25% of the total pore volume with water. More preferably still, the support particles are wetted so as to fill between about 5 and about 15% of the total pore volume with water.

It is a critical feature of the invention that the partially hydrated support for the catalyst herein be prepared by contacting the support particles while in motion, and preferably in motion relative to each other, with a gas phase comprising a substantial proportion of water vapor. It is believed that, in comparison to other methods for hydrating gamma alumina supports, as by contact with liquid water, the present method results in a uniform hydration of the support particles which in turn imparts superior catalytic properties to the final catalyst composition. The present method provides for the surface of each catalyst particle to contact an essentially equivalent amount of water vapor for an essentially equivalent time period, thereby resulting in a more uniform hydration than would be the case, for example, if a stationary bed of support particles was held in contact with steam or liquid water. In the latter instance, those portions of a particle's surface in contact with a neighboring particle cannot contact any water, whether the hydrating medium is liquid water or steam, and thus, the surface of even a single support particle is non-uniformly hydrated. In contrast, the method of the invention is theorized to hydrate the surface of each individual support particle relatively uniformly, with the support particles themselves believed to deviate in hydration by no more than about 20% from the average. Thus, if a batch of support particles is hydrated such that the average hydration is 0.05 cc. of water per gram of particle, then the particular proportion of hydration believed expected in any individual particle is between about 0.04 and 0.06 cc./gm.

It is also believed that three additional factors in the hydration method of the invention play a role in producing the highly active catalyst of the invention. The use of steam is theorized to produce a chemically different surface than is the case if liquid water is utilized, and it is also believed that steam, having far better diffusivity than liquid water, proves superior thereto since steam can more readily penetrate the pores of a gamma alumina particle and thus more easily hydrate the remotest portions thereof. In addition, since hydration of gamma alumina is known to proceed by highly exothermic chemical reactions, the highly beneficial results of the invention may in part be due to the motion of the support particles in contact with a gaseous hydrating medium, which motion is believed to dissipate the heat of reaction away from the surface of the support particles at a faster rate than would be the case if liquid water were utilized. Such dissipation of heat is further enhanced when the moving support particles are contacted with flowing steam as the hydrating medium.

As stated hereinabove, it is critical in this invention that the gamma alumina-containing support particles be hydrated by contact with water vapor while the particles are in motion. In one embodiment of the invention, therefore, the support particles are maintained in a suitable reactor vessel under ebullient conditions while steam is passed through the reactor in contact with said particles. In another embodiment more useful on a commercial basis, the support particles are placed in a rotating mixer, into which an atmosphere of steam is provided. In these and other embodiments of the invention, it is preferred that a gas stream consisting essentially of water vapor, and most especially a gas stream of saturated steam at about 14 to about 50 p.s.i.a., be utilized, but useful results may be obtained with a gas mixture containing a substantial proportion of water vapor, as for example, a gas stream containing at least about 15 vol.% water vapor, with said water vapor usually being at a partial pressure above about 2 p.s.i.a., and more preferably above about 5 p.s.i.a.

After the gamma alumina-containing support particles have been partially hydrated in accordance with the method of the invention, the particles are then contacted with one or more liquid impregnant solutions containing dissolved nickel, molybdenum, and/or phosphorus components. Preferably, a single aqueous impregnant solution is utilized, and in the preferred embodiment, this solution comprises dissolved nickel nitrate hexahydrate, ammonium heptamolybdate, and phosphoric acid. The concentrations of dissolved nickel, molybdenum, and phosphorus components depends, of course, on such factors as the amount of each component desired in the final catalyst composition and the desired activity thereof. In general, however, the impregnant solution comprises dissolved nickel in a concentration of 1 to 10% by weight as NiO, molybdenum in a concentration of 10 to 50% by weight as $MoO_3$, and phosphorus in a concentration of 1 to 10% by weight as P.

The most highly preferred impregnation method involves contacting the hydrated support particles with the liquid impregnant under conditions assuring that a predetermined amount of metals and phosphorus is taken up by the support. A usual method, commonly referred to as the pore saturation method, involves determining the pore volume available in the hydrated support and then contacting the support particle with an amount of impregnant solution as will just fill the available pore volume with the required amount of metals and phosphorus. A less preferred method differs from the foregoing procedure in that the support particles are immersed in an excess of solution having a predetermined metal and phosphorus content for a sufficient period of time, usually two minutes or less, to just allow the impregnant to enter and completely fill the pore volume of the support, with the amount of liquid so entering containing the desired amount of metals and phosphorus required in the final catalyst.

After the gamma alumina support particles have been impregnated with the desired amount of metals and phosphorus, the resulting impregnated composites are dried and subjected to a final calcination, usually by contacting the composites with flowing air at a temperature in the range of 800° to 1000° F, for a time period sufficient to convert the nickel and molybdenum components to the oxide forms thereof. The catalyst is then sulfided, as by presulfiding the catalyst in a reducing, gaseous atmosphere containing hydrogen sulfide, or with a sulfur-containing hydrocarbon feedstock under conditions of elevated temperature and pressure, and in the presence of hydrogen, such that the oxide components of the catalyst are converted to sulfides.

The final catalyst usually comprises 12 to 30 wt.% of molybdenum components (calculated as the trioxide), 2 to 6 wt.% of nickel components (calculated as the monoxide), and 2 to 6 wt.% of phosphorus components (calculated as P). In the most preferred catalyst, the weight ratio of nickel components as NiO to molybdenum components as $MoO_3$ is between about 0.15:1 and 0.20:1, and the weight ratio of phosphorus components as P to nickel components as NiO is between about 0.5:1 and 1:1.

Catalysts prepared in accordance with the invention may be used to hydrotreat any hydrocarbon feedstock or fraction thereof containing sulfur and/or nitrogen components. Typical hydrocarbon feedstocks suitable for treatment herein are light and heavy gas oils, cycle oils, naphthas, kerosene, turbine fuels, diesel fuels and syncrudes such as shale oils. The preferred feedstocks are gas oils, and in particular gas oils or vacuum gas oils having at least 50% of the components thereof boiling at temperatures less than 700° F., preferably less than 650° F. The typical gas oil to be treated by contact with the catalyst described herein contains at least 2 ppmw of nitrogen components (calculated as nitrogen), usually 10-5000 ppmw of nitrogen components, and at least 0.02% by weight of sulfur components (calculated as sulfur), usually 1.0-3.0% by weight. The nitrogen components and the sulfur components are generally present in the feedstock essentially completely in the form of organonitrogen and organosulfur compounds, respectively.

Hydrotreating with the catalyst herein is accomplished under conditions known in the art for denitrogenating and/or desulfurizing hydrocarbon feedstocks in the presence of hydrogen. In the usual instance, the feedstock is passed at an elevated temperature and pressure through a catalytic reactor containing a stationary bed of catalyst. Hydrogen is also passed through the reactor with the feedstock, and the hydrogen not consumed in converting the sulfur components to $H_2S$ and the nitrogen components to $NH_3$ is separated from the denitrogenated and/or desulfurized product oil and recycled to the inlet of the reactor. The conditions employed vary from feedstock to feedstock, but the range of conditions set forth in the following table will be those typically employed:

TABLE I

| Operating Conditions | Suitable | Preferred | Most Preferred |
|---|---|---|---|
| Temperature, °F. | 400–1000 | 600–850 | 650–800 |
| Pressure, PSIG | 100–5000 | 400–3000 | 500–2000 |
| Space Velocity, LHSV | 0.1–15 | 1–10 | 2–7 |
| Hydrogen Recycle Rate cf/bbl[1] | 400–20000 | 1000–15000 | 4000–10000 |

[1]Measured at 60°F. and 1 atmosphere

Although the conditions chosen for any given feedstock will depend in large measure upon the quality of the product desired and the concentrations of sulfur and nitrogen in the feedstock, conditions are usually selected to remove a substantial proportion of both nitrogen and sulfur components, usually at least 50% of each and preferably at least 80% of the sulfur components and 90% of the nitrogen components. Most preferably, conditions are chosen to reduce the nitrogen compounds concentration to less than 10 ppmw (as N) and the sulfur compounds concentration to less than 200 ppmw (as S).

The following comparative example is provided to illustrate the improved performance obtainable with the catalyst of the invention; it is not intended to limit the scope of the invention which is defined by the claims.

COMPARATIVE EXAMPLE

Eleven catalysts were prepared, two in accordance with the invention, and each was tested under typical hydrotreating conditions against a reference catalyst consisting of particles of a commercially available catalyst sold under the designation HCF by the American Cyanamid Company. The HCF catalyst had a clover leaf cross-sectional shape and was of nominal composition: 18 wt.% $MoO_3$, 2.9 wt.% NiO, 3.2 wt.% P, and the balance gamma alumina. The eleven catalysts compared against this commercial catalyst were prepared as follows.

The first four catalysts were prepared utilizing a wetting step wherein the support particles were only partially pore saturated with liquid water at the time of impregnation. The catalysts were prepared as follows:

Catalyst No. 1

Ammonium heptamolybdate (36 g) was placed in a beaker containing 40 ml of water and was dissolved by stirring for 30 seconds. To the resulting solution, 9.5 ml of 85% $H_3PO_4$ was added, followed by 21 gm of Ni(NO$_3$)$_2$.6H$_2$O. After dissolution of the nickel nitrate, an impregnant solution having a volume of 70.5 ml was obtained.

Gamma alumina support particles, substantially identical in size and shape to those utilized in preparing the HCF reference catalyst, but having a pore volume per gram of 0.72 cc/gm, a surface area of 254 m$^2$/gm, and a compact bulk density of 0.57 gm/cc, and further having been once precalcined at about 1150° F., were again precalcined, this time at 1200° F. The particles (125 gm) were then cooled to ambient temperature and wetted with 30 ml of distilled water by slowly adding the water to a beaker containing the support particles. Due to exothermic heat generated by contact with water and alumina, the temperature of the particles reached about 95°–100° F., and as a result, some water evaporated while the remainder entered the pores of the alumina. After cooling in air to ambient temperature, the support particles were then contacted with the impregnant solution. All 70.5 ml of the impregnant solution was taken up by the support.

The impregnated composite was allowed to stand for two hours, following which it was oven-dried at 110° C.

and calcined at 900° F. for ½ hour in flowing air. The final catalyst contained 18 wt.% molybdenum components, calculated MoO$_3$, 3.3 wt.% nickel components, calculated as NiO, and 2.6 wt.% phosphorus components, calculated as P.

Catalyst No. 2

This catalyst was prepared in a manner similar to that of Catalyst No. 1, but for a reason not totally understood, only 82% of the impregnant was taken up by the support. Evidently, much less water had evaporated than had occurred in the preparation of Catalyst No. 1, and thus more water was present in the pores of the support at the time of impregnation.

After calcination, Catalyst No. 2 was determined to contain 14.76 wt.% molybdenum components, calculated as MoO$_3$, 2.7 wt.% nickel components, calculated as NiO, and 2.1 wt.% phosphorus components, calculated as P.

Catalyst No. 3

This catalyst was prepared in the same manner as Catalyst No. 1 except that the support particles were precalcined at 1000° F. instead of 1200° F. and only 10 ml of water were utilized to wet the gamma alumina support particles. The resulting catalyst had the same composition as Catalyst No. 1.

Catalyst No. 4

This catalyst was prepared in the same manner as Catalyst No. 3 except that after the wetting step, the support particles were oven dried at about 230° F. and then again wetted as before with 10 ml of water. The support particles were impregnated in the same manner as Catalyst No. 3 and finished in the same way. The resulting catalyst, therefore, had the same composition as Catalyst No. 3.

Three catalysts were prepared utilizing a wetting step wherein the support particles were completely saturated with liquid water at the time of impregnation. The catalysts were prepared in the following manner:

Catalyst No. 5

An impregnation solution was prepared as follows: 29 gm ammonium heptamolybdate was introduced into a vessel containing enough water to make a 90 ml slurry. To the slurry was added 9.6 gm of 85% H$_3$PO$_4$ solution, and the resulting mixture was stirred vigorously to produce a liquid solution. Nickel nitrate hexahydrate (34 gm) was then dissolved in the solution, and water was added to dilute the solution to 80 ml.

The foregoing impregnant solution was utilized to impregnate 100 gm of gamma alumina support particles identical to those described with respect to Catalyst No. 1, the support particles prior to impregnation having been precalcined at 1500° F., cooled to ambient temperature, and wetted by pore saturation with 75 ml of water. The impregnation itself was accomplished in a beaker by pouring the impregnant liquid over the support particles and then adding sufficient water to cover the support particles with liquid. The beaker containing the impregnant liquid-support particles slurry was covered with saran plastic film and placed in an electrically driven mechanical shaker assembly. After 20 hours of gentle shaking, the beaker was removed from the mechanical shaker, and the excess liquid was separated from the catalyst on a Buchner funnel. The impregnated composite was then placed on a screen, dried for two hours at 100° C., and calcined in flowing air for ½ hour at 900° F. The resulting catalyst contained 14.9 wt.% molybdenum components, calculated as MoO$_3$, 2.9 wt.% nickel components, calculated as NiO, and 2.2 wt.% phosphorus components, calculated as P.

Catalyst No. 6

An impregnation solution was prepared as follows: 148 gm of ammonium heptamolybdate was added to 325 ml water. With vigorous stirring of the resulting mixture, 20 drops of concentrated ammonium hydroxide solution were added to effect some dissolution of the ammonium heptamolybdate. Dissolution was completed by adding 37.5 gm of 85% H$_3$PO$_4$ solution, following which 114 gm of nickel nitrate hexahydrate was also dissolved, resulting in a solution having a volume of about 460 ml.

The foregoing impregnant solution was utilized to impregnate 130 gm of gamma alumina support particles identical to those described with respect to Catalyst No. 1, the support particles having been precalcined only once and having been completely saturated with water subsequent to the precalcination but prior to impregnation. The impregnation was accomplished by immersing the support particles in the entire 460 ml of impregnant and allowing the particles to soak for 16 hours, after which the excess solution was separated from the impregnated composite by means of a Buchner funnel. The impregnated composite was then oven dried for two hours at 110° C. and calcined in flowing air for two hours at 900° F. The resulting catalyst contained 25.4 wt.% molybdenum components, calculated as MoO$_3$, 3.7 wt.% nickel components, calculated as NiO, and 2.9 wt.% phosphorus components, calculated as P.

Catalyst No. 7

This catalyst was prepared in the same manner as Catalyst No. 6 except that the soak time of the impregnation was only 4 hours. The resulting catalyst differed only slightly in composition from that of Catalyst No. 6.

The next two catalysts were prepared by a wetting technique wherein a large amount of exothermic heat was released during the wetting procedure.

Catalyst No. 8

Gamma alumina particles were prepared in the size and shape of those utilized in the preceding experiments but were characterized by a high pore volume (0.81 cc/gm), a surface area of 283 m$^2$/gm, and a compact bulk density of 0.49 g/cc. Thirty-nine grams of these support particles were wetted with a total of 13 ml water. The wetting was done by adding the water in three increments into a beaker containing the support particles, with stirring between each addition. A large amount of heat was liberated, as evidenced by condensation of water on the inside of the beaker. The beaker was very hot to the touch. After waiting a few minutes, the wetted, hot support particles were impregnated with 30 ml of a 100 ml solution containing 52 gm ammonium heptamolybdate, 13.5 ml of 85% H$_3$PO$_4$, and 30 gm nickel nitrate hexahydrate. The impregnated composite was allowed to stand for two hours, oven dried at 110° C., and calcined at 900° F. for ½ hour in flowing air. The final catalyst contained 22.8 wt.% molybdenum components, calculated as MoO$_3$, 4.1 wt.% nickel components, calculated as NiO, and 3.2 wt.% phosphorus components, calculated as P.

Catalyst No. 9

An impregnation solution was prepared by placing 36 gm ammonium heptamolybdate in 40 ml water and effecting dissolution by adding 9.5 ml of 85% H$_3$PO$_4$ with vigorous stirring. Twenty-one grams of nickel nitrate hexahydrate was then dissolved in the solution, bringing the total solution volume to 72 ml.

Support particles (125 gm) identical to those utilized to prepare Catalyst No. 1 were precalcined at 1500° F., placed in a beaker, and wetted with 30 ml water. A large amount of heat was liberated, as evidenced by the condensation of water on the inside of the beaker and the fact that the beaker was very hot to the touch. After a few minutes, the hot support particles were impregnated by pore saturation with the 72 ml impregnant solution. The impregnated composite was then finished in the same manner as Catalyst No. 8. The final catalyst contained 18 wt.% molybdenum components, calculated as $MoO_3$, 3.3 wt.% nickel components, calculated as NiO, and 2.6 wt.% phosphorus components, calculated as P.

Two catalysts were then prepared in accordance with the invention.

Catalyst No. 10

A catalyst of the invention was prepared as follows: 150 grams of gamma alumina support particles of the kind described in the preparation of Catalyst No. 1 was placed in a two liter column having a small inlet for the introduction of gas at the bottom. Air was introduced through the bottom of the tube at a flow rate sufficient to lift essentially all the support particles off the bottom of the tube, after which the air rate was decreased substantially (but not completely) and steam introduced in its stead at a rate sufficient to keep the support particles in an ebullient condition similar to that maintained by the air flow. The steam so introduced was saturated steam at about 20 p.s.i.g. After no more than about 10 minutes of combined steam and air flow through the bed, the support particles were weighed and found to have been hydrated with 11.3 gm of water, an amount approximately equivalent to that which would have occupied 10% of the pore volume.

Ammonium heptamolybdate (43 gm) was added to about 45 ml of water, and after the resultant mixture was stirred, 11.4 ml of 85% phosphoric acid was added to help dissolve the ammonium salt. Then 25.2 gm of $Ni(NO_3)_2 \cdot 6H_2O$ was dissolved into the solution. The final solution had a volume of 85 ml and was used to impregnate the steam-treated support particles by pore saturation. The impregnated particles were then allowed to stand in air for 2 hours, following which they were oven dried overnight at 110° C. and calcined in flowing air at 900° F. for 2 hours. The final catalyst had the following composition: 18.7 wt.% $MoO_3$, 3.30 wt.% NiO, 2.93 wt.% P with the balance consisting essentially of gamma alumina.

Catalyst No. 11

This catalyst, also prepared in accordance with the invention, was produced by the same method as described for Catalyst No. 10 except that the steam flow was fed for a sufficient period of time so as to hydrate the support particles with 15.75 gm of water, an amount equivalent to that which would have occupied about 15% of the pore volume. The final catalyst had the same composition as Catalyst No. 10.

Catalysts Nos. 1 to 11 and the HCF catalyst were then each presulfided by contact with a gas stream consisting of 10 vol.% $H_2S$ and 90 vol.% $H_2$. The temperature during the presulfiding was initially at room temperature and then was gradually increased hourly by 50° F. until 700° F. was reached. The 700° F. temperature was held for two hours.

Catalysts Nos. 1 to 11 were then tested to determine their individual activities for hydrodenitrogenation and hydrodesulfurization in comparison to the reference HCF catalyst. Catalysts Nos. 1 to 4, 8, and 9 were each charged to a reactor and utilized at 700° F. to hydrotreat gas oil feedstock A having the characteristics shown in Table II under the following conditions: 1400 psig total pressure; 4.0 LHSV, and hydrogen rate of 6000 CFH/bbl (measured at 60° F. and 1 atmosphere). Giving the reference HCF catalyst an arbitrary activity of 100, the relative activities of Catalysts Nos. 1 through 4, 8, and 9 compared to the HCF catalyst were determined by calculation and tabulated in Table III. These determinations were based on a comparison of the reaction rates for denitrogenation and desulfurization obtained from the data of the experiment according to the following standard equations which assume first order kinetics for denitrogenation and one and a half order kinetics for desulfurization:

$$\text{Relative Denitrogenation Activity} = \frac{\text{Log } (N_f/N_p)}{\text{Log } (N_{fr}/N_{pr})} \times 100$$

where $N_{fr}$ and $N_{pr}$ are the respective concentrations of nitrogen in the feed and product obtained with the reference catalyst and $N_f$ and $N_p$ are the respective concentrations of nitrogen in the feed and product obtained with a catalyst being compared to the reference, and $$\text{Relative Desulfurization Activity} = \frac{[(1/S_p)^{\frac{1}{2}} - (1/S_f)^{\frac{1}{2}}]}{[(1/S_{pr})^{\frac{1}{2}} - (1/S_{fr})^{\frac{1}{2}}]} \times 100$$

where $S_{fr}$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

Catalysts Nos. 5 to 7 were similarly activity tested against HCF catalyst except that a liquid hourly space velocity of 2.0 was utilized, and Catalysts Nos. 10 and 11 were activity tested against HCF catalyst in the same manner as Catalysts Nos. 5 to 7 except that feedstock B, whose characteristics are shown in Table II, was utilized. Since Catalysts Nos. 5 to 7, 10, and 11 were, like Catalysts Nos. 1 to 4, 8, and 9, activity tested against HCF catalyst tested under the same conditions, it is proper to calculate their relative denitrogenation and desulfurization activities by the mathematical equations set forth above and compare the results against the data obtained with Catalysts Nos. 1 to 4, 8, and 9. The comparison is shown in Table III, and the data clearly reveal the superiority of Catalysts Nos. 10 and 11 prepared in accordance with the invention. Catalysts Nos. 10 and 11 were markedly superior to all other catalysts in overall hydrodenitrogenation and hydrodesulfurization activity.

TABLE II

| FEEDSTOCK A CHARACTERISTICS | | | |
|---|---|---|---|
| Boiling Range, °F. | | | |
| IBP/5 | 250/460 | Gravity, D287, °API | 24.6 |
| 10/20 | 512/545 | Sulfur, wt. % | 1.35 |
| 30/40 | 577/600 | Nitrogen: | |
| 50/60 | 626/664 | Basic, wt. % | 0.0738 |
| 70/80 | 691/725 | Total, wt. % | 0.1810 |
| 90/95 | 767/804 | Pour Point, D-97, °F. | +40 |
| EP/Rec., Vol. % | 833/99.3 | Carbon Residue on 10% Botts, D-524, wt. % | 0.32 |
| FEEDSTOCK B CHARACTERISTICS | | | |

TABLE II-continued

| Boiling Range, °F. | | | |
|---|---|---|---|
| IBP/5 | 362/481 | Gravity, D287, °API | 24.6 |
| 10/20 | 498/529 | Sulfur, wt. % | 1.30 |
| 30/40 | 556/585 | Nitrogen: | |
| 50/60 | 618/642 | Basic, wt. % | 0.0688 |
| 70/80 | 675/711 | Total, wt. % | 0.188 |
| 90/95 | 750/781 | Pour Point, D-97, °F. | +35 |
| EP/Rec., Vol. % | 801/98.0 | Carbon Residue on 10% Botts, D-189, wt. % | 0.18 |

TABLE III

| | COMPOSITION, Wt. % | | | | RELATIVE ACTIVITIES AT 700° F.[1] | | |
|---|---|---|---|---|---|---|---|
| CATALYSTS | MoO$_3$ | NiO | P | HYDRATION METHOD | Basic Nitrogen | Total Nitrogen | Sulfur |
| Reference | 18 | 2.9 | 3.2 | None | 100 | 100 | 100 |
| No. 1 | 18 | 3.3 | 2.6 | 33% Pore Saturation with Liquid Water | 115 | 118 | 103 |
| No. 2 | 14.76 | 2.7 | 2.1 | 33% Pore Saturation with Liquid Water | 116 | 130 | 94 |
| No. 3 | 18 | 3.3 | 2.6 | 11% Pore Saturation with Liquid Water | 114 | 124 | 100 |
| No. 4 | 18 | 3.3 | 2.6 | 22% Pore Saturation with Liquid Water | 118 | 118 | 110 |
| No. 5 | 14.9 | 2.9 | 2.2 | 100% Pore Saturation with Liquid Water | 102 | 106 | 91 |
| No. 6 | 25.4 | 3.7 | 2.9 | 100% Pore Saturation with Liquid Water | 114 | 120 | 116 |
| No. 7 | 23.7 | 3.7 | 2.8 | 100% Pore Saturation with Liquid Water | 117 | 114 | 120 |
| No. 8 | 22.8 | 4.1 | 3.2 | 41.1% Pore Saturation with Liquid Water and Large Heat Release | 106 | 96 | 86 |
| No. 9 | 18 | 3.3 | 2.6 | 33% Pore Saturation with Liquid Water and Large Heat Release | 72 | 78 | 97 |
| No. 10 | 18.7 | 3.3 | 2.93 | 10% Pore Saturation with Steam | 136 | 135 | 152 |
| No. 11 | 18.7 | 3.3 | 2.93 | 15% Pore Saturation with Steam | 125 | 127 | 133 |

[1]Relative activities determined on a volume basis, i.e., the data compare the relative activities of equivalent volumetric amounts of catalyst.

Although the invention has been described in conjunction with a comparative example and a preferred embodiment thereof, it is evident that many alterations, modifications, and variations of the invention will appear to those skilled in the art in light of the foregoing description. Accordingly, it is intended in the invention to embrace all such alternatives, modifications, and variations as fall within the spirit and scope of the appended claims.

I claim:

1. A catalyst composition active when sulfided for hydrodenitrogenation or hydrodesulfurization comprising nickel, molybdenum, and phosphorus components in combination on a porous refractory oxide support comprising gamma alumina, said catalyst composition having been prepared by a method including the steps of:
   (1) partially hydrating porous support particles comprising gamma alumina by contacting said particles with a gas comprising at least about 15 vol.% water vapor at a partial pressure of at least about 2 p.s.i.a. while said support particles are in motion;
   (2) subsequently impregnating the partially hydrated support particles with dissolved nickel, molybdenum, and phosphorus components; and
   (3) calcining the resulting composite at an elevated temperature in the presence of oxygen.

2. A catalyst composition comprising nickel, molybdenum, and phosphorus components active in combination for hydrodenitrogenation or hydrodesulfurization on a porous refractory oxide support comprising gamma alumina, said catalyst composition having been prepared by a method including the steps of:
   (1) partially hydrating porous support particles containing a substantial proportion of gamma alumina by contacting said particles with a gas mixture comprising at least about 15 vol.% water vapor at a partial pressure of at least about 5 p.s.i.a. while said support particles are in motion relative to each other;
   (2) subsequently introducing into the pores of the partially hydrated support particles nickel, molybdenum, and phosphorus components dissolved in an aqueous medium; and
   (3) calcining the resulting composite at an elevated temperature in the presence of air and sulfiding the calcined composite.

3. A catalyst composition comprising nickel, molybdenum, and phosphorus components active in combination for hydrodenitrogenation or hydrodesulfurization on a porous refractory oxide support comprising gamma alumina, said catalyst composition having been prepared by a method including the steps of:
   (1) partially hydrating porous support particles containing a substantial proportion of gamma alumina by contacting said particles with a flowing gas stream comprising at least about 15 vol.% water vapor at a partial pressure of at least about 5 p.s.i.a. while said support particles are in motion relative to each other, said partial hydrating being such that essentially every support particle deviates in hydration from the average hydration of all the particles by no more than about 20%;
   (2) subsequently introducing into the pores of the partially hydrated support particles nickel, molybdenum, and phosphorus components dissolved in an aqueous medium; and
   (3) calcining the resulting composite at an elevated temperature in the presence of air and sulfiding the calcined composite.

4. A catalyst composition consisting essentially of nickel, molybdenum, and phosphorus components catalytically active for promoting hydrotreating reactions on a porous refractory oxide support consisting essentially of gamma alumina, said catalyst composition comprising 12 to 30 wt.% molybdenum components, calculated as MoO$_3$, 2 to 6 wt.% nickel components, calculated as NiO, and 2 to 6 wt.% phosphorus components, calculated as P, and having been prepared by a method including the steps of:
   (1) partially hydrating porous support particles consisting essentially of gamma alumina by contacting said particles with a gas consisting essentially of steam while said particles are in motion relative to each other, said support particles being partially hydrated by said contacting with an amount of water equivalent to that which would occupy between about 5 and 25% of the total pore volume;

(2) impregnating said partially hydrated support particles with an aqueous liquid containing nickel, molybdenum, and phosphorus components in dissolved form, said impregnating being such that sufficient nickel, molybdenum, and phosphorus components are introduced into said support particles so as to provide a composite containing between about 12 and 30 percent by weight molybdenum components, calculated as $MoO_3$, between about 2 and 6 percent by weight nickel components, calculated as NiO, and between 2 and 6 percent by weight phosphorus components, calculated as P; and (3) calcining the impregnated composite produced in step (2) and thereafter sulfiding the calcined composite.

5. A catalyst composition as defined in claim 1, 2, 3, or 4 wherein said support particles in step (1) are maintained in motion as an ebulliating bed.

6. A catalyst composition as defined in claim 1, 2, 3, or 4 wherein said catalyst particles are kept in motion in step (1) by a rotating mixer.

7. A catalyst composition as defined in claim 1, 2, or 3 wherein said partial hydrating in step (1) is accomplished with a gas mixture comprising at least about 50% water vapor.

8. In a method for preparing a hydrotreating catalyst wherein support particles comprising a substantial proportion of gamma alumina are impregnated with an aqueous solution containing nickel, molybdenum, and phosphorus in dissolved form and then calcined in the presence of air, the improvement wherein the support particles are partially hydrated by contact of a gas mixture comprising water vapor in a substantial proportion with said support particles while said support particles are in motion relative to each other and wherein said partially hydrated particles are then impregnated with said aqueous solution.

9. A catalyst composition useful for the desulfurization or denitrogenation of hydrocarbon feedstocks by reaction with hydrogen, said catalyst composition comprising nickel, molybdenum, and phosphorus active components on a support comprising gamma alumina, said catalyst having been prepared by a method including the steps of partially hydrating support particles comprising gamma alumina by contact with a gas comprising a substantial proportion of water vapor while said support particles are in motion relative to each other, impregnating the partially hydrated support with nickel, molybdenum, and phosphorus components, and calcining the resulting composite at an elevated temperature in the presence of oxygen.

10. A catalyst composition as defined in claim 9 wherein said support particles are maintained in motion as an ebulliating bed during said hydrating.

11. A catalyst composition as defined in claim 10 wherein, after said calcining, the catalyst composition is sulfided.

12. A catalyst composition as defined in claim 9, 10, or 11 wherein said gas consists essentially of steam.

* * * * *